May 21, 1957

T. L. MENGE 2,792,984

PRESSURE BLOWER

Original Filed June 23, 1945

INVENTOR.
THEODORE L. MENGE,
BY

*John B. Brady*
ATTORNEY

May 21, 1957 T. L. MENGE 2,792,984
PRESSURE BLOWER

Original Filed June 23, 1945 7 Sheets-Sheet 4

INVENTOR.
THEODORE L. MENGE,
BY
John B. Brady
ATTORNEY

FIG. 7

INVENTOR.
THEODORE L. MENGE,
BY
John B Brady
ATTORNEY

May 21, 1957

T. L. MENGE 2,792,984

PRESSURE BLOWER

Original Filed June 23, 1945

INVENTOR.
THEODORE L. MENGE,
BY
John B. Brady
ATTORNEY

United States Patent Office 2,792,984
Patented May 21, 1957

2,792,984
PRESSURE BLOWER

Theodore L. Menge, Shreveport, La., assignor of one-fourth to A. F. Flournoy and one-fourth to Pike Hall, Shreveport, and one-eighth to Wilson Edward Campbell, Caddo Parish, La.

Original application June 23, 1945, Serial No. 601,167, now Patent No. 2,634,903, dated April 14, 1953. Divided and this application April 8, 1953, Serial No. 347,442

11 Claims. (Cl. 230—138)

My invention relates to blowers and more specifically to improved blade mechanisms for housing incased blowers.

This application is a division of my application Serial No. 601,167, filed June 23, 1945, now Patent 2,634,903, dated April 14, 1953.

Before entering into a discussion of my invention in blower mechanisms, to enable the reader to better understand its operation and to better explain its departure from the teachings of the prior arts concerned with blowers, I will enter into a discussion of the mode of operation of my invention in blowers in comparison with the mode of operation of prior art types of blowers with which it is most nearly related.

Blowers may be roughly classified in two classes. The first is the class which we call the propeller class, to which class belong the well known household fans, the ceiling type fan and the buzz type fan. In the first propeller class of fan the blades are extended in radial directions from a common shaft in an arrangement where the blades are set at angles with respect to the common shaft and also set at angles to their plane of rotation. When this type of fan operates to push air, the blades may be said to slide through the volume of air it is pushing.

In the second class of blower with which my blower is to be compared, the blades, more often referred to as vanes, are extended in radial directions with respect to a common axle and lie in planes passing through their axis of rotation. Some blowers of this type have their blades curved in their lengthwise direction. Some are curved in their widthwise direction while other are curved in both their lengthwise and widthwise directions.

In some types of this second class of blowers the vanes proper commence at the axle to which they are joined and with which they rotate, while in others the vane areas commence at a radial distance from their common axle and are mounted on it by means of spiders or the like.

In this second class of blower, as in the first class, all of the vanes are fixed to a common shaft in fixed relationship to one another so that all the vanes rotate as a unit. All of this second class of blowers, hereafter referred to as centrifugal blowers, as far as applicant knows, operate upon a principle that makes use of centrifugal force alone imparted to volumes of air confined between the radially extending vanes as the force applied is impelling a stream of air.

In the centrifugal blower as known to the prior art, the air is taken into the blower in a direction along the axle to which the vanes are attached. In some styles of these centrifugal blowers, air is taken in from one end of the axle of rotation of the blower while in the other styles the air is brought in at both ends of the axle.

The blower of my invention also makes use of centrifugal force applied to the volume of air between its vanes, but it also applies other forces to the stream of air it impels, as will be explained hereinafter.

Each blade of my blower is separately rotatably mounted on a common blade axle, preferably through means of a pair of mother bearing collars rotatably mounted on the cross bar in which the blades are pivotally mounted. The shaft is held stationary and the blades are separately revolved about it. Each blade is made to revolve through a cycle of speeds, progressively increasing from a minimum speed to a maximum speed and then progressively decreasing down again to the minimum speed.

The reader will appreciate that my type of blower, even considered as having but one blade, will produce a blowing action since the volume of air in front of the blade is brought up to the maximum speed of the blade after which it continues to move away from the blade under its own momentum while the blade is slowing down.

An object of my invention is to provide a blower adapted to work against a head pressure.

Another object of my invention is to provide a blower capable of drawing air into its intake side at subatmospheric pressures and one capable of discharging air from its exhaust side against a substantial head pressure.

Another object of my invention is to provide a blower mechanism that operates on the principle of pushing air in a manner similar to the pushing action of a piston in a cylinder.

Another object of my invention is to provide a blower mechanism in which the slip incidental to its operation is reduced to a minimum.

Other objects and advantages of my invention will appear in my hereinafter following detailed description of my blower mechanism illustrated in the accompanying drawings in which.

Figure 1:
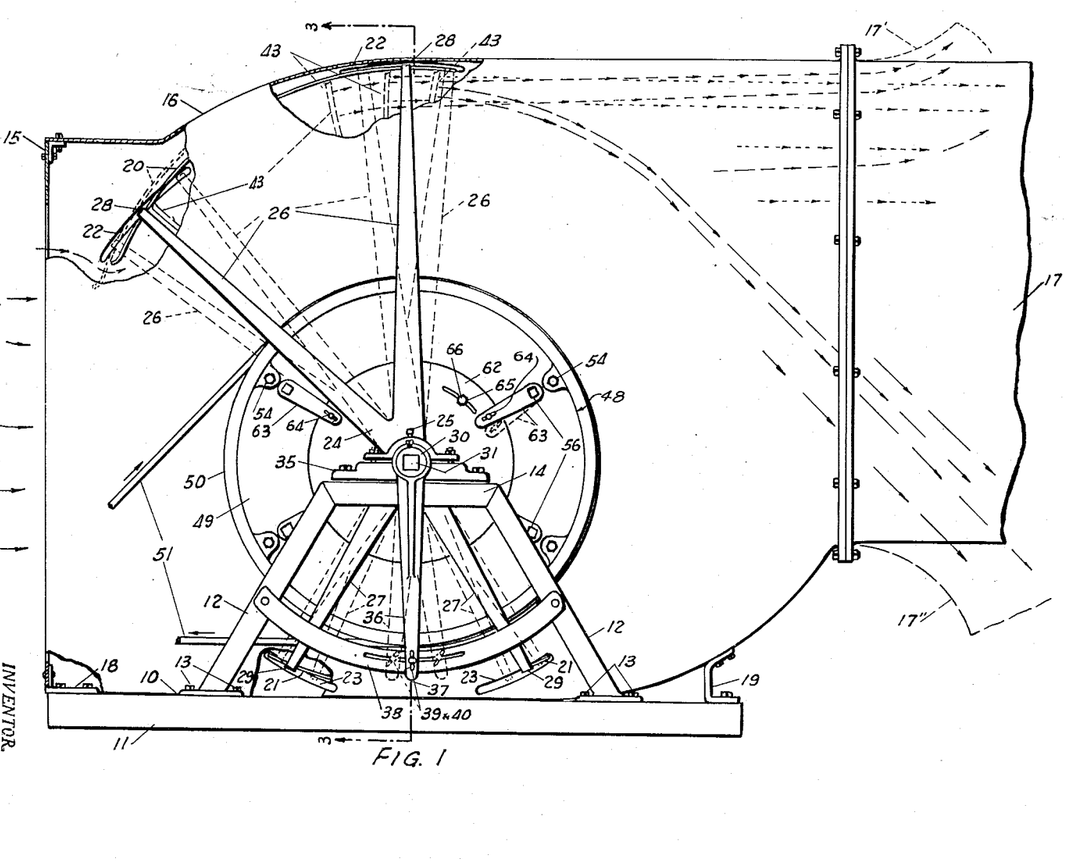
Figure 1 is a vertical side elevational view, partially broken, of a preferred form of blower mechanism embodying my invention.
Figure 2:
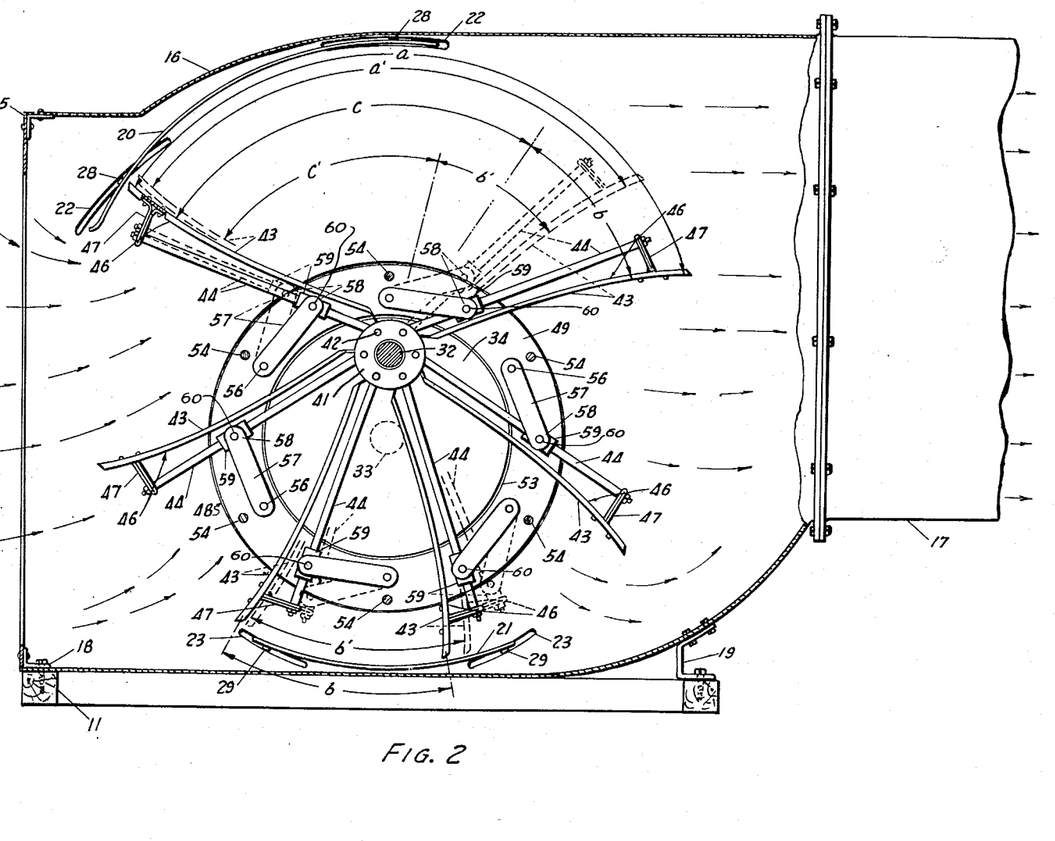
Fig. 2 is a broken vertical side elevational view of the mechanism illustrated in Fig. 1, the view being taken on line 2—2 of Fig.3.
Figure 3:
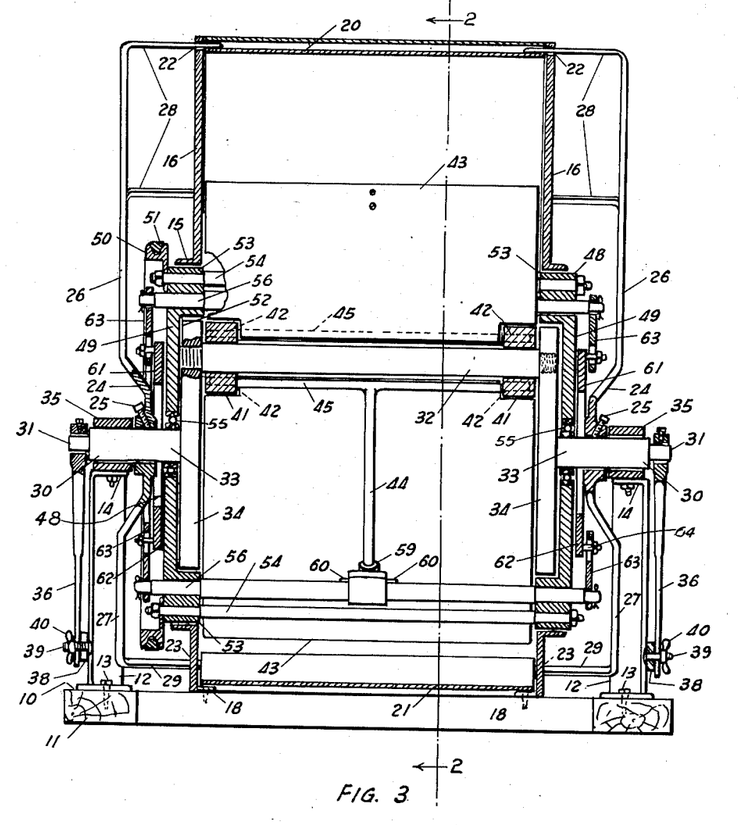
Fig. 3 is a vertical cross sectional view of the mechanism illustrated in Fig. 2 taken on line 3—3 of Fig. 1 as viewed from the right end of Fig. 1.

Referring to Figs. 1, 2 and 3 of the drawings, numeral 10 designates generally the frame portion of my blower comprising a base 11 on which a pair of side frames 12 are mounted in vertical positions parallel to each other and bolted to the base 11 with bolts 13.

The blower mechanism proper is supported on the top members 14 of the side frames 12 by means of the shaft bearings 35. The housing 15, made up of a main body portion 16 and a housing extension 17, is attached directly to the base 11 by means of its rear feet 18 and its forward feet 19. A crown 20 positioned at the top of the housing 15 and a pan 21 positioned at the bottom of the housing 15 are rotatably, adjustably mounted and supported by the means of a pair of spiders 24 secured to the shaft 30 by means of set screw 25. The shaft 30, the spiders 24, the crown 20 and the pan 21 form a unit and as a unit are adjustably mounted on the stud portions 33 of the shaft 30.

Each spider 24 is provided with a pair of upwardly extending arms 26 positioned outside of the housing 15. The upwardly extending arms 26 carry crown supporting fingers 28 that extend inwardly into the housing 15 through the crown finger slots 22. The lower pair of downwardly extending arms 27 of the spider 24 are provided with pan supporting fingers 29 extended through the pan finger slots 23 to support the pan 21 at the bottom of the housing 15.

All of the moving parts of my fan mechanism which will hereafter be mentioned and also the above described spiders 24 are carried by the shaft 30 which is made in the shape of a crank shaft. The shaft 30 is made up of two stud shafts 33 extending outwardly from the center of disc portions 34 and a cross bar 32 threadedly engaged to the disc portions 34. The outer ends of the stud shafts 33 terminate in squared end portions 31. The shaft 30 is rotatably mounted in the pair of split bearings 35 attached to the top members 14 of the frames 10.

Before going further with my description, I want to say that the shaft 30 does not turn during the operation of the blower although it is adjustably mounted in the bearings 35. It is adapted to be locked in a set position by means of the locking arms 36 fitted to the squared ends 31 of the shaft 30. The slotted end portions 37 of the locking arms 36 are clamped to the calibrated slotted segments 38 forming parts of the side frames 12 by means of bolts 39 and wing nuts 40. By this means of adjustment, the cross bar 32 of the shaft 30 may be set in various angular adjusted positions with respect to the vertical plane passing through the stud shaft portions 33 of the shaft 30 resting in the bearings 35.

The angular position of adjustment of the cross bar 32 is dictated by the R. P. M. of the blades 43 themselves due to the fact that for more efficient operation the shaft 30 should be adjusted to a critical angle dependent upon the R. P. M. of the blades 43. The higher the R. P. M. of the blades 43, the farther back from the vertical center position the cross bar 32 should be set for reasons that will be made clear to the reader further on in this specification.

The blades 43 including their guide rods 44 are rotatably mounted on the cross bar 32 through the means of mother bearing collars 41 which are rotatably mounted on the cross bar 32. The mother bearing collars 41 are each provided with six equally circumferentially spaced stud shaft bearings 42 in which the six blades 43 themselves are pivotally mounted by means of their blade supporting shafts 45. The mother bearing collars 41 and the blades 43 assembled in them should be placed on the cross bar 32 before it is screwed into the disc portions 34 of the shaft 30 during the assembly of the shaft 30.

The guide rods 44 of the blades 43 are extended perpendicular outwardly from the blade supporting shafts 45 at their centers.

The blades 43 are rotated by means of the cage 48. The cage 48 is rotated through the means of the driving pulley 50 secured to the left hand side plate 49 and the driving belt 51 extended over the driving pulley 50 from a source of power not shown. The cage or rotor 48 is made up of a pair of side plates 49 joined together by spacing rods 54 that are fastened into circular rim portions 53 of the side plates 49. The side plates 49 have centrally depressed portions 52 shaped to accommodate the disc portions 34 of the shaft 30. The side plates 49 revolve about the disc portions 34 which are held stationary. This construction is adopted to prevent air from being blown back from the pressure side of the blower to the intake side of the blower when the blower operates against a head pressure as will be explained hereinafter.

The side plates 49 of the cage are spaced outwardly from the disc portions 34 by the spacing rods 54. The cage 48 is rotatably mounted on the stud shafts 33 by means of a pair of roller bearings 55.

The blades 43 are connected to the cage 48 by means of rocker arms 56 which are pivotally mounted in side plates 49. Each rocker arm 56 includes a push bar 57 extending perpendicularly from its center. In the forked shaped end 58 of each push bar 57 a knuckle slide bearing 59 is pivotally mounted by means of a pair of pivot bolts 60. The knuckle slide bearings 59 embrace the guide rods 44 forming parts of the blades 43 which guide rods are spaced from the rear sides of the blade webs 46 by means of the web spacing brackets 47 bolted to the outer ends of the guide rods 44. This spacing gives room for the knuckle bearings 59 to slide along the guide rods 44 back and forth during the operation of the blower.

Before the blower can be operated the rocker arms 56 must be locked into adjusted positions by means of the rocker arm locking mechanism 61. It is through this mechanism that the capacity of this preferred type of blower is changed within limits as will be explained later.

The locking mechanism 61 is made up of the right and left slotted ring shaped locking plates 62 supported by the slotted fingers 63 by means of the stud pins 64 secured in the locking mechanism 61.

The locking mechanism 61 is made up of the right and left slotted ring shaped plates 62 mounted in surrounding positions over the right and left studs 33 respectively of the shaft 30. The locking plates 62 are supported by means of stud pins 64 secured to the same which extend through the slotted fingers 63. The slotted fingers 63 are secured to the outer ends of the rocker arms 56 which are rotatably mounted in the side plates 49. The push bars 57, forming integral parts of the rocker arms 56, may be rotated in unison outwardly or inwardly by rotating the locking plates 62. When the proper setting of the push bars 57 is determined, they are held in such a setting by clamping the locking plates 62 to the side plates 49 of the cage 48 by means of the clamping bolts 65 and the clamping nuts 66. When the clamping nuts 66 are screwed down tightly, the slotted plates 62 turn with the side plates 49.

Figures 4, 5:
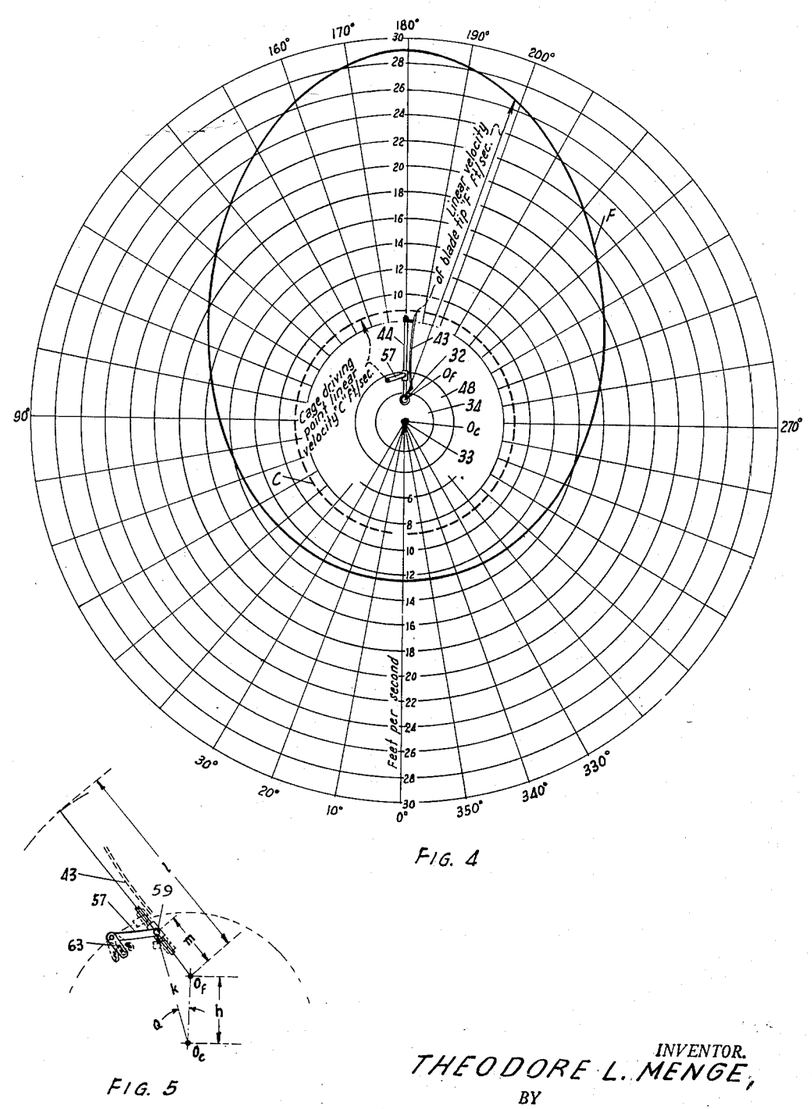
Fig. 4 is a diagrammatic view illustrating the operation of the preferred form of blower.
Fig. 5 is a diagrammatic view illustrating the operation of the preferred form of blower.

The effective working radius of the cage 48 is the radial distance from its axis of rotation $O_c$ to the extended tip end of a push bar 57, the distance $k$ shown in the diagrammatic view, Fig. 5 of the drawings, the position of the axis of rotation of a knuckle slide bearing 59 which is pivotally mounted in the tip end of the push bar 57. When all of the push bars 57 are evenly adjusted, their tip ends lie in a circle whose radius is $k$. It is pointed out here to the reader, however, that all of the tip ends of the push bars 57 do not have to lie in a common circle for my preferred form of fan to operate. So long as no two blades 43 of the blower strike each other at any position in their revolutions about the cross bar 32, the fan will operate.

It is due to the fact that the guide rods 44 are permitted to slide through the knuckle slide bearings 59 that this preferred form of blower fan operates in which operation the cage 48 revolves about an axis $O_c$ while the blades 43 are revolved about another axis $O_f$. It is pointed out here to the reader that the feature of the slide bearing 59 and the guide rod 44 on which it slides is itself not essential in the construction of a blower mechanism embodying my invention. Further on in this specification there will be described a blower mechanism embodying my invention in which will be found no reciprocating parts at all.

In my blower as illustrated in my drawings, the blower mechanism proper, that is to say the blower mechanism with the entire housing 15 removed, will still operate efficiently as a blower and will operate in the following manner. The principal volume of air being drawn into my blower travels in a direction at right angles to the vertical plane extended through its axis of rotation $O_f$ of blade 43 and is discharged through the opposite side of the blower in a direction at right angles to the same plane. However, the discharged air is expelled, as nearly as could be determined from observing the operation of a working model of the same, in a generally diverging wedge shaped pattern.

With the housing 15 removed, a small portion of the air drawn into the blower was seen to be drawn in directions endwise to the blades 43 in the opening movement of the blades 43 and a small portion of the discharged air was seen to be expelled in endwise directions of the blades 43. In an experiment with this model where side walls were placed close to the ends of the blades 43, the intake stream of air was substantially all channelled in a straight line direction perpendicular to the vertical plane passing through the axis of rotation $O_f$ and the discharged air was expelled in a better defined wedged shaped pattern.

The blades 43 of my blower at any given moment will be observed to move at different speeds although each one is carried through the same cycle of speeds as explained above. To make this clearer to the reader, I will say that during a part of the rotation of a pair of adjacent blades 43, the leading blade 43 will be seen to outrun the following blade 43 until such time that the maximum angle of opening between the adjacent blades 43 has occurred. This opening movement of the blades may be thought of as the intake stroke of my blower. After the maximum angle of opening has been reached, the following blade, even though it starts slowing down, approaches the blade ahead of it because the blade ahead of it is slowing down at a greater rate and finally comes to it by the angular distance measured by the minimum angle of opening. This closing movement of the blades 43 may be thought of as the discharge stroke of my blower. The reader will now appreciate that my blower in addition to operating on the principle of centrifugal force applied to the air and the pushing action imparted to the air by the blades 43, operates in still a third manner, that of squeezing the air during a closing movement of pairs of blades 43.

Referring to Fig. 2 of the drawings, it is pointed out to the reader that the solid lines indicate the position of the blades 43 for the maximum opening at the top and also the position for the minimum opening at the bottom. The angle of maximum opening is designated by the letter "$a$" and the angle of minimum opening is designated by the letter "$b$." The capacity angle $c$ at the top is the difference between angle $a$ and angle $b$ and is a measure of 1/6 of the capacity of the blower per revolution (C. P. R.), while $6 \times c$ is a measure of the total capacity of the blower per revolution (C. P. R.).

The setting for maximum capacity shown by the solid lines on Fig. 2 is a setting wherein the push bars 57 are revolved inwardly as far as allowed by the slotted locking plates 62. The dotted lines on Fig. 2 represent the setting for minimum capacity wherein the push bars 57 are revolved as far outwardly as can be permitted by the slotted locking plates 49. In the minimum capacity setting, the maximum opening is designated by $a'$, the minimum opening by $b'$, and the difference by angle $c'$, wherein $c'$ is the measure of 1/6 of the capacity per revolution of the blower.

There are many conditions in which it is desirable to change the capacity of the blower without changing its speed of rotation. It is, of course, understood that the effective capacity of the blower may also be varied by the change in its rate of revolution. Actual working tests on the working model above referred to in this specification have shown that a high degree of efficiency in operation was maintained under higher than 50% variations in the rotating speeds of the blower.

In Fig. 1 of the drawings, the dotted line arrows indicate the direction of travel of the angular cylindrical section of air leaving the blade 43 at the position where the blade 43 is beginning to slow down. The section of air that has gained the maximum velocity of the blade 43 continues on under its own momentum and leaves the blade 43 which is slowing down. This volume of air, however, is compelled to travel under the curved crown 20 in a circular direction. This action of the pushing blade 43 on the air might be thought of as a slapping force on the air.

The blade 43 also turns the angular cylindrical section of air confined between adjacent blades 43 in a direction in line with the straight cylindrical housing extension 17. The pushing blade 43 also, in approaching the blade 43 ahead of it, squeezes the angular cylindrical section of air out into the housing extension 17.

The shaft 30 may be set in a manner to decrease the air friction in installations wherein there is employed an upturned elbow housing extension 17' or a down-turned housing extension 17'' such as shown by the short and long dash lines of Fig. 1. The upturned housing extension 17' is outlined with short dash lines and the direction of the air approaching it is outlined with short dash arrows, while long dash lines are used to outline the down-turned housing extension 17'' and long dash arrows to indicate the flow of air toward it.

Experience in operating a working model of a blower made according to the disclosure of this specification, showed under test, that even when the straight housing extension 18 was used, the cross bar 32 should be set about 10 degrees back of vertical center line for best efficiency when the revolutions per minute of the cage 48 (R. P. M.)$_c$ were between 50 and 125. I attribute this lag in operation to the inertia of the air itself.

Referring to the diagrammatic view, Fig. 4, letter C designates the linear velocity of the driving points of the cage 48 in feet per second.

$$C, \text{ in ft./sec.} = \frac{(\text{R. P. M.})_c}{60} \times \frac{2\pi k}{12}$$

Where
(R. P. M.)$_c$ = revolutions per minute of the driving points of the cage 48 about the cage axis of revolutions $O_c$ and which factor is constant.
$k$ = radial distance in inches between axis of revolution $O_c$ of the cage 48 and the driving points of the cage 48 (pivot axes of the knuckle slide bearings 59). $k$ is made a constant by means of the rocker arm locking means 61 during a continuous run of the blower.

The value of C as found by the calculation to follow and as shown by the dotted line polar graph of the same in Fig. 4 was determined from the known factors as follows wherein (R. P. M.)$_c$=100 and $k$=10 inches. Substituting these known values $$C = \frac{100}{60} \times \frac{2\pi 10}{12} = 8.72 \text{ ft. per second}$$

Letter F designates the linear velocity of the extreme tip of the fan blades 43 and is found from the following equation:

$$F = \frac{(\text{R. P. M.})_f}{60} \times \frac{2\pi l}{12}$$

$$F = \frac{(\text{R. P. M.})_c}{60} \times \frac{2\pi l}{12} \times \frac{k(k+h \cos Q)}{m^2}$$

$$F = \frac{(\text{R. P. M.})_c}{60} \times \frac{2\pi l}{12} \times \frac{k^2 - h^2 + m^2}{2m^2}$$

Where
$Q$ = angle turned by the cage 48 as shown by the dotted line through $k$ measured from a dotted line passing through the two centers of revolution $O_c$ and $O_f$.
(R. P. M.)$_f$ = revolution per minute of the fan blade 43 about its axis of revolution $O_f$. (R. P. M.)$_f$ varies, as earlier explained, through a cycle of speeds. Its value at any degree of rotation is dictated by the position of the knuckle slide bearing 59 on the guide rod 44 forming a part of the blade 43, $m$ = radial distance in inches from axis of revolution of the blade $O_r$ to the driving point of the cage 48. This factor is a variable, the value of which is dictated by the position of the knuckle slide bearing 59 on the guide rod 44. The value of $m$ varies from its minimum value when the blade 43 is extended directly upwardly along the 180° radius line as shown on the diagram of Fig. 4 to a maximum value when it is extended directly downwardly on the 0° radius line. Since the $(R. P. M.)_c$ is maintained constant and $k$ and $l$ being fixed distances are therefore constant it can be seen from the equation that F varies proportionally to the value of the variable fraction.

$$\frac{k(k+h \cos Q)}{m^2}$$

or $$\frac{k^2-h^2+m^2}{2m^2}$$

That is to say $(R. P. M.)_c$ varies inversely to $m^2$, $k$ being constant during an entire run of the blower.

Assuming the blade 43 to be at the 180° radial position, the position of maimum velocity as shown in Fig. 4, angle Q would be zero, making cos $Q = 1$ and Where $(R. P. M.)_c = 100$
$k = 10$ inches
$m = 6$ inches
$h = 4$ inches
$l = 20$ inches The value of the blade tip speed is found by a solution of the equation of F as follows:

$$F = \frac{(R. P. M.)_c}{60} \times \frac{2\pi l}{12} \times \frac{k^2-h^2+m^2}{2m^2}$$

Substituting known values in the equation:

$$F = \frac{100}{60} \times \frac{2\pi \times 20}{12} \times \frac{100-16+36}{2 \times 36} = 29.08 \text{ feet per sec.}$$

When the blade 43 is at 0° radial position it is moving at its slowest speed. At this position only, the value $m$ has changed: $m$ at the 0° radius = 14 inches $$F = \frac{100}{60} \times \frac{40}{12} \times \frac{10^2-4^2+14^2}{2(14^2)} = 12.46 \text{ feet per sec.}$$

The value of F may likewise be calculated for the other radial positions of the fan blades 43.

The capacity of my blower per revolution (C. P. R.) is determined by the maximum magnitude of the fraction $$\frac{1}{m^2}$$

The value of $k$ in the preferred form of blower may be varied for different runs of the blower as explained above through the means of the rocker arm locking means 61. An adjustment of the rocker arm locking means 61 effects a change in the radial distance $k$ of the knuckle slide bearing from the axis of rotation of the cage $O_c$.

For convenience in comparison I have shown in Fig. 4 a polar diagrammatic plot of the linear speed of the driving points of the cage 48, dotted circle C, and superimposed on it, a polar plot of the linear speed of the tip of the blades 43, the solid line oval shaped curve, designated by letter F. Both curves are plotted on common radial ordinates emanating from the circle $O_c$ and angularly measured abscissa. The reader should keep in mind, however, that the blades 43 are revolved about their own axis of rotation $O_r$ which axis is offset from the axis of rotation of the cage $O_c$ by the distance $h$ as seen in Fig. 5 of the drawings.

The distance $h$ is one of the principal controlling factors in the design of blowers made under the teachings of my invention wherein a cage or other mechanical equivalent blade rotating means is used. The above statement applies both to the preferred embodiment of my blower illustrated by Figs. 1–5 and also to the modified form of my blower illustrated by Figs. 6–9 inclusive to be explained further on.

It is to be understood, however, that my invention in blowers is not to be limited to blower constructions that only incorporate cage type blade turning mechanisms or their mechanical equivalents for my inventive concept of blowers includes any mechanism adapted to rotate blades about a common axle at separately varying speeds in the useful manner above described.

Disregarding variations in the value of $k$, accomplished by the rocker arm locking means 61, the capacity of my preferred type blower illustrated by Figs. 1–5, is determined by the value of $h$. That is to say the capacity (C. P. R.) of the preferred form of blower is increased as $h$ is increased, and vice versa.

My modified form of blower is illustrated by Figs. 6, 7, 8 and 9 of the drawings. The principal differences between this modified form of blower and the preferred form of blower resides in a link arrangement for driving its blades used in place of the knuckle bearings slide 59 and the guide rod 44 of the preferred form of blower.

Figure 6:
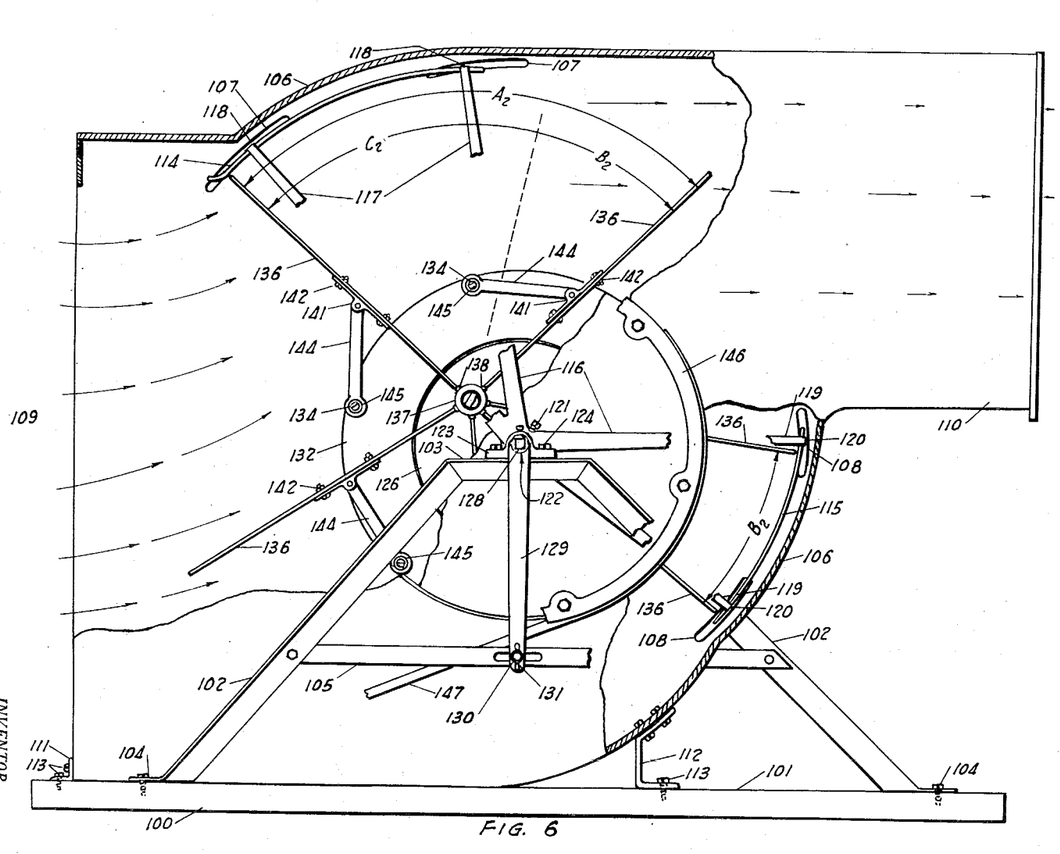
Fig. 6 is a broken side elevational view of a modified form of blower embodying my invention.
Figure 7:
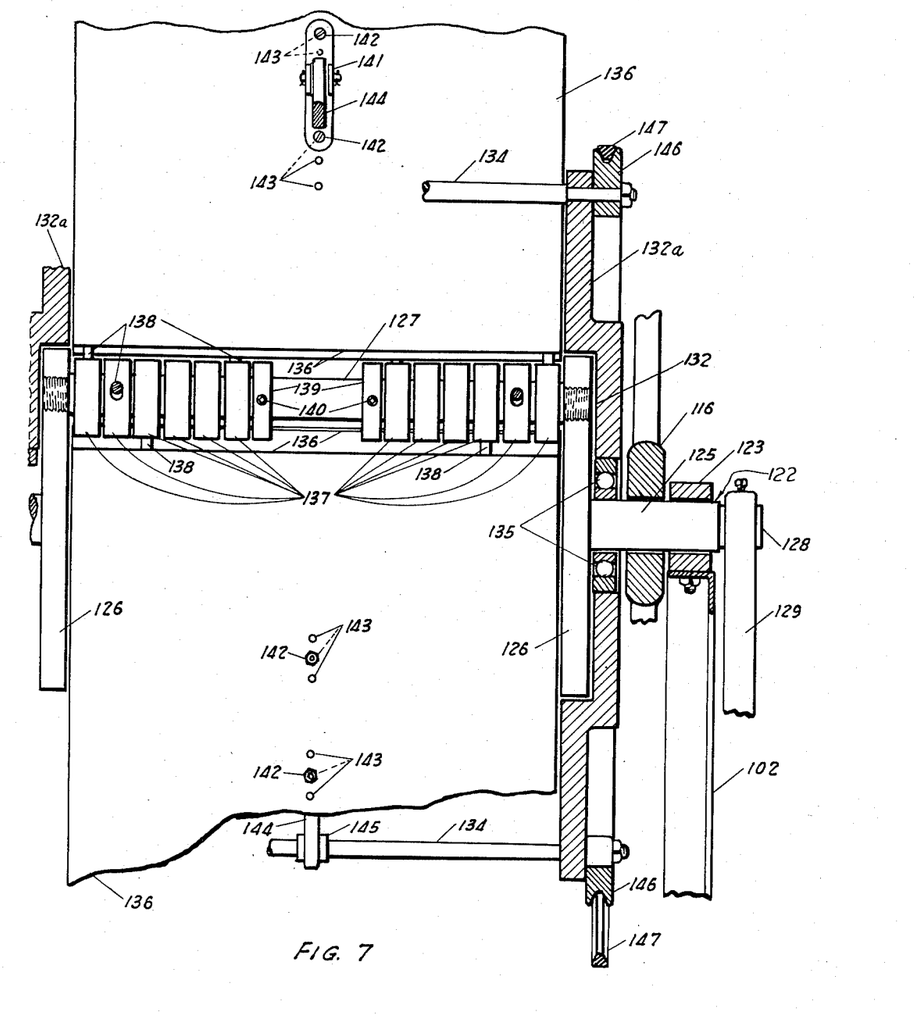
Fig. 7 is a fragmentary view illustrating an adjustable part of the structure illustrated in Fig. 6.

The frame structure 100 includes a base 101 on which a pair of A frames 102 provided with top members 103 are mounted by means of bolts 104. Each A frame 102 is provided with a slotted middle brace 105. The housing 106 is provided with crown finger slots 107 and pan finger slots 108, an intake opening 109 and a discharge opening 110. The housing 106 is provided with a pair of rear feet 111 and a pair of forward feet 112 which are secured to the base 101 by means of bolts 113. A crown 114 and a pan 115 are rotatably mounted within the housing 106 by means of a pair of spiders 116 provided with a pair of upwardly extending arms 117 from which crown supporting fingers 118 are extended through the crown finger slots 107 and joined to the crown 114. The spiders 116 are provided also with forwardly extending arms 119 which arms 119 are provided with pan supporting fingers 120 extending through the pan finger slots 108 and joined to the pan 115. The spiders 116 are attached by means of set screws 121 directly to the shaft 122. The shaft 122 is adjustably, rotatably mounted in bearings 123 mounted on the top members 103 of the A frame 102 by means of bolts 124.

Shaft 122 is made exactly the same as the shaft 30 of the preferred form of blower in that it is provided with stud portions 125 adapted to fit in the bearings 123. The stud portions 125 are made integral with the disk portions 126 which are joined together by the cross bar 127. The stud portions 125 are provided with squared ends 128 on which adjusting levers 129 are mounted. The angular positions of the cross bar 127 of the shaft 122 are determined through the means of the adjusting levers 129 which are adapted to be clamped to the slotted middle braces 105 by clamping bolts 130 and clamping nuts 131.

The cage 132 in this modified form of blower is made substantially the same as the cage 48 of the preferred form of blower in that it is made up of a pair of centrally depressed side plates 132a joined together by means of spacing rods 134. The cage 132 as a unit is rotatably mounted on the stud portions 125 of the shaft 122 by means of roller bearings 135. The blades 136 are individually, rotatably mounted on the cross bar 127 through the means of pairs of bearing collars 137 to which the blades 136 are directly attached by means of supporting studs 138. The bearing collars 137 are properly positioned by guide collars 139 provided with set screws 140. An adjustable link bracket 141 is mounted on the rear side of each blade 136 by means of a pair of screws 142 which are screwed into a pair of threaded holes 143 made in the blade 136. In this modified form of blower the capacity may be changed by changing the position of the adjustable link brackets 141 on the blade 136. The pushing links 144 which are pivotally mounted on the link brackets 141 and pivotally mounted by means of their sleeve portions 145 at the centers of the spacing rods 134 are fixed in so far as length is concerned. This blower is driven by means of a pulley 146 and a belt 147 connected to a source of power not shown.

During the operation of this modified form of blower the pushing links 144 assume various angular positions in their plane of rotation as a result of their being pivoted to the blades 136 which separately rotate at varying speeds about the blade axis $O_{f'}$ which is parallel to, but spaced from the axis of rotation of the cage $O_{c'}$. The cage 132 pushes the blades 136 through the means of the links 144 for a clockwise rotary motion of the cage as shown in Fig. 6. When the cage 132 is rotated counterclockwise it pulls the blades 136 through the means of the pushing links 144. The operation of this modified form of blower will become more apparent from my discussion to follow of the diagrammatic views, Figs. 8 and 9, illustrating its mode of operation.

The capacity of the modified form of blower as in the preferred form of blower is measured by the differences between the maximum angle of opening $A_2$ and the angle of minimum opening $B_2$ which is angle $C_2$. Since this modified blower has only six blades 136, $6 \times C_2$ is a measure of its capacity per revolution (C. P. R.).

Figures 8, 9:
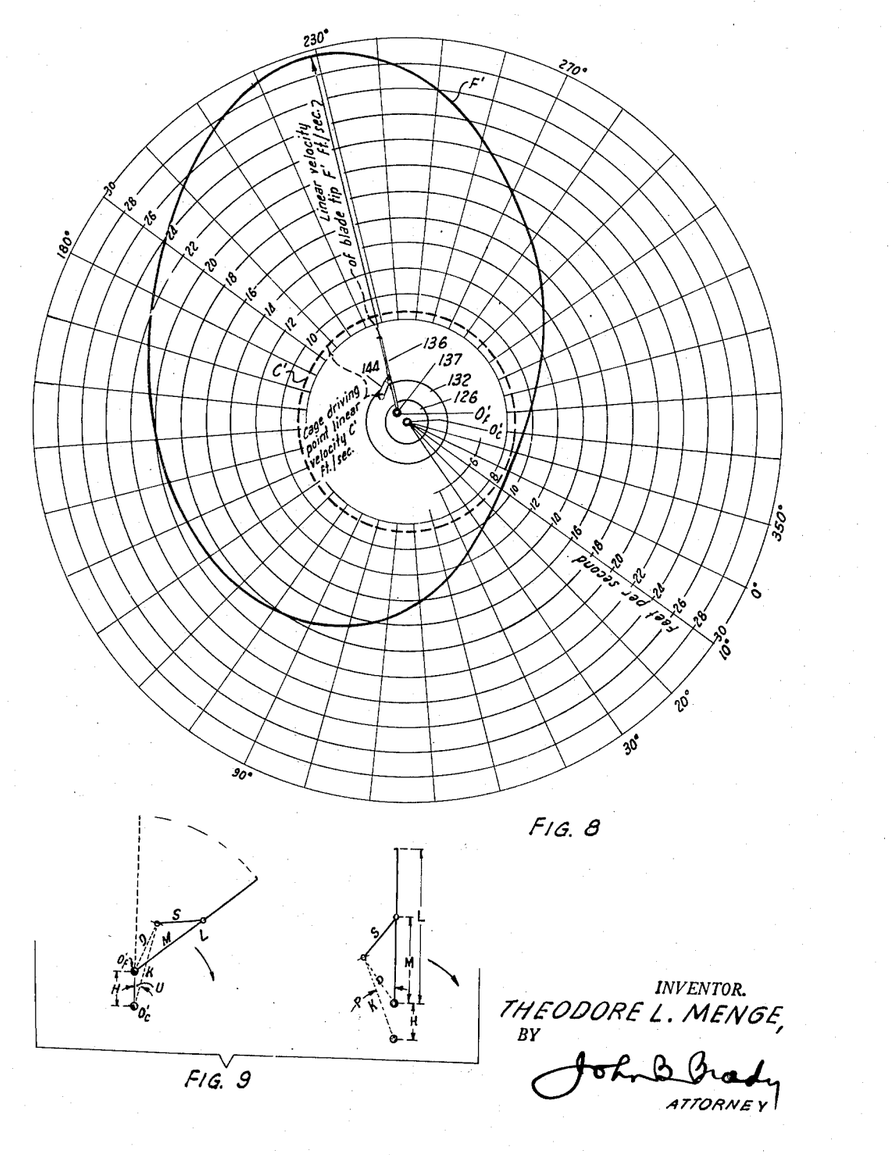
Fig. 8 is a diagrammatic view illustrating the operation of the modified form of blower illustrated by Fig. 6.
Fig. 9 is a diagrammatic view illustrating the operation of the modified form of blower illustrated by Fig. 6.

The linear velocity of the cage driving points C′ and the blade linear velocity of the blade tips F′ in Fig. 8 are both plotted on the same radial ordinates and angularly measured abscissa. The driving points of the cage 132 in this modified form of blower are the center points of the center lines of the spacing rods 134.

$$C' \text{ in ft./sec.} = \frac{(R. P. M.)_c}{60} \times \frac{2\pi k}{12}$$

Where $(R. P. M.)_c$ = revolutions per minute of the driving points of the cage 132 about the cage axis of revolution $O_{c'}$ and which factor is constant.

$k'$ = the radial distance in inches between the axis of rotation $O_{c'}$ of the cage 132 and the driving points of the cage 132 and which factor is a constant.

The value of C′ as shown by the calculation to follow and the dotted line polar graph of the same in Fig. 8 was determined from a condition wherein $$(R. P. M.)_c = 100$$
$$k = 10$$
$$C' = \frac{100}{60} = \frac{2\pi 10}{12} = 8.72 \text{ ft./sec.}$$

The value of F′ which designates the linear velocity of the blade tip of a blade 136 of the modified blower for all of the positions of the blade 136 is shown by the polar graph in Fig. 8. The value of F′ at any position of the blade 136 may be found from the following equations. Condition wherein link 144 pushes the blade 136 Wherein $R$ = radius of cage 132 to point where link 144 is fastened to it, measured in inches, a constant.
$H$ = distance between centers of rotation of the cage $O_{c'}$ and the center of rotation of the blades $O_{f'}$, measured in inches a constant.
$M$ = distance from blade axis of rotation $O_{f'}$ to point where link 144 is fastened to blade 136, measured in inches a constant.
$S$ = length of link 144 measured in inches, a constant.
$L$ = length of blade 136, measured in inches, a constant.
$U$ = angle turned by cage 132 from reference axis joining two centers of rotation $O_{c'}$ and $O_{f'}$, a variable.
$P$ = a constant angle whose value is given by $$\cos P = \frac{(M-H)^2 + K^2 - S^2}{2K(M-H)}$$

As seen in the diagram of Fig. 9, P is the angle between the axis of reference, the dotted vertical line, and a line joining the axis of rotation of the cage $O_{c'}$ to where the link 144 is fastened to the cage 132 when the blade 136 lies along the axis of reference.

$$D^2 = H^2 + K^2 + 2HK \cos (U-P)$$

which is a variable $$F' = \frac{(R. P. M.)_c K}{60 D^2} \times$$
$$\frac{2\pi L}{12}\left[ K + H \cos (U-P) + \frac{H(D^2 + S^2 - M^2) \sin (U-P)}{\sqrt{4M^2 S^2 - (S^2 + M^2 - D^2)^2}} \right]$$

Condition wherein length 144 pulls blade 136

$$F' = \frac{(R. P. M.)_c K}{60 D^2} \times$$
$$\frac{2\pi L}{12}\left[ K + H \cos (U-P) - \frac{H(D^2 + S^2 - M^2) \sin (U+P)}{\sqrt{4M^2 S^2 - (S^2 + M^2 - D^2)^2}} \right]$$

Any change in the dimensional factors in the equation set forth above will produce entirely different diagrams from the one shown in Fig. 8 of the drawing. Through the means of the velocity diagram of F′ of the modified form of blower and the velocity diagram F of the preferred form of blower acceleration diagrams could be produced if desired as aids in the study of the forces acting on the various moving members of the blowers.

Various changes in the size and arrangement of the parts of the illustrated mechanisms may be resorted to within the scope of my invention. For example, the mother bearing collar 41 of the preferred form of blower may be incorporated in the modified form of blower in place of the bearing collar 137 found in the same, or the bearing collar 137 might be used in the preferred form of the blower.

The details of manufacturing my invention will present no problems to manufacturers engaged in the manufacture of other types of blowers, pumps, and similar mechanisms. I will point out, however, that due to the fact that since the blades 43 of the preferred form of blower, and the blades 136 of the modified form of blower are carried through rapid changes in their velocities, that these blade members should preferably be made out of a very light material, such as aluminum.

What I claim as new and desire to secure by Letters Patent of the United States is as follows:

1. In a blower mechanism, the combination of a supporting structure constituting a guide for a rotor, a multiplicity of blades pivotally mounted with respect to said supporting structure and said rotor and movable about a common axis of rotation extending through said supporting structure, a blade rotating means, driving members movably connected to said blades and pivotally connected to said rotor and pivotally connected to said blade rotating means, a locking means adapted to lock said driving members in longitudinally adjusted positions on said blades to vary the angular position of said blades about their axis of rotation when said blade rotating means is stationary for the purpose of varying the volume of air per revolution discharged by said blades, said blade rotating means operating to turn all of said blades simultaneously through cycles of speeds varying progressively from minimum to maximum speeds and thence in progressively decreasing speeds down to the minimum speeds.

2. In a blower mechanism, a rotor, a supporting structure, said supporting structure constituting a guide for said rotor, a multiplicity of blades pivotally mounted with respect to said supporting structure and said rotor for movement about a common axis of rotation and in circumferential alignment with one another, each of said blades being provided with a guide rod, each of said guide rods being extended outwardly in a plane perpendicular to the axis of rotation of said blades, a blade rotating means comprising a rotatable member rotatably mounted with respect to said supporting structure about an axis of rotation spaced from and parallel to the axis of rotation of said blades, blade driving members connecting said blades to said blade rotating member, said blade rotating means operating to turn all of said blades at the same time consecutively through duplicate out-of-phase cycles of speeds varying progressively from minimum speeds to maximum speeds and thence in progressively decreasing speeds down to the minimum speeds, whereby all of said blades during a single revolution of the same about their axis of rotation are controlled to move angularly away from one another during a portion of the rotation to perform an air intake operation and are controlled to move angularly toward one another during a succeeding portion of their rotation to perform an air discharge operation.

3. In a blower mechanism as set forth in claim 2 wherein said guide rods extend in radial directions from the axis of rotation of said blades.

4. In a blower mechanism, the combination of a supporting structure, a rotor, said supporting structure constituting a guide for said rotor, a multiplicity of blades rotatably mounted with respect to said supporting structure and said rotor about a common axis of rotation in circumferential alignment with one another, a guide rod connected with each of said blades, said guide rod being perpendicularly extended from the axis of rotation of said blades, a blade rotating means including a rotatable member rotatably mounted on an axis of rotation spaced from and parallel to the axis of rotation of said blades, a plurality of elongated circumferentially spaced pushing members extending from said rotatable member, blade driving members movably connecting said pushing members at positions on said pushing members circumscribing the axis of revolution of said blades, said blade rotating means being operative to turn all of said blades simultaneously and consecutively through cycles of speeds varying progressively from minimum speeds to maximum speeds and thence in progressively decreasing speeds down to the minimum speeds, whereby all of said blades during a single revolution of the same are controlled to move angularly away from one another during a portion of their revolution and are controlled to move angularly toward one another during another portion of their revolution.

5. A blower mechanism as set forth in claim 1 including a housing enclosing said blades and a portion of said blade rotating means, said housing being provided with a crown member positioned close to the path of the tip edge of said blades, said housing being provided with a pan member positioned close to the path of movement of the tip edges of said blades.

6. A blower mechanism comprising a supporting structure, a pair of stud shafts mounted on said structure in spaced axial alignment with each other, a disc carried by each of said stud shafts, a transverse bar extending between said discs in a position eccentric to the axes of said stud shafts, a multiplicity of blades, means pivotally connecting the respective blades with said bar, a cage including side portions extending exteriorly of and parallel to said discs, a locking blade assembly associated with said discs and said blades for adjusting the angular position of said blades, means for rotatably driving said cage with respect to said discs and imparting movement to said blades, and means for adjusting the position of said transverse bar and correspondingly fixing the axis about which said multiplicity of blades pivot.

7. A blower mechanism as set forth in claim 6 in which the means for adjusting the position of said transverse bar are associated with each of said stud shafts for orienting said shafts and adjusting the relation of the centers of said blades with respect to the angular position of said locking blade assembly.

8. A blower mechanism comprising a frame structure including a pair of axially spaced bearings, a stud shaft mounted in each of said bearings in axial alignment with each other and directed inwardly toward each other, a disc supported on the interior ends of said stud shafts, a transverse bar mounted adjacent the peripheries of said discs and extending therebetween, a rotatable cage enveloping said discs and including opposite end portions disposed parallel to the exterior sides of said discs and terminating in bearings journaled on said stud shafts, a multiplicity of fan blades, a rotatable collar mounted on each end of said transverse bar, means pivotally connecting said fan blades at peripherally spaced positions about said collars, rocker arms extending from the end portions of said cage and connected with said last mentioned means, and means for adjusting the position of said rocker arms with respect to said cage.

9. A blower mechanism as set forth in claim 8 in which the means for adjusting the position of said rocker arms with respect to said cage consists of annular members surrounding said stud shafts and adjustably connected with said rocker arms.

10. A blower mechanism as set forth in claim 8 in which said means for adjusting the position of said rocker arms with respect to said cage consists of ring members extending immediately adjacent the exterior sides of said cage and radially extending members adjustably connecting the ends of said rocker arms with positions on the exterior surfaces of said ring members.

11. A blower mechanism as set forth in claim 8 in which one end of said cage is provided with means for rotatably driving said cage and wherein there is disposed concentrically within said means and coplanar therewith a ring member surrounding one of said stud shafts and disposed immediately adjacent one end of said cage, and wherein said ring member is adjustably connected with the ends of said rocker arms.

References Cited in the file of this patent

UNITED STATES PATENTS

| 735,956 | Douglas | Aug. 11, 1903 |
| 1,007,866 | Greene | Nov. 7, 1911 |
| 1,516,053 | Morgan | Nov. 18, 1924 |
| 1,550,835 | Morgan | Aug. 25, 1925 |
| 1,917,444 | Gregg | July 11, 1933 |
| 2,095,987 | Kratzer | Oct. 19, 1937 |
| 2,362,541 | Delancey | Nov. 14, 1944 |
| 2,634,903 | Menge | Apr. 14, 1953 |

FOREIGN PATENTS

| 1,732 | Great Britain | of 1881 |
| 75,499 | France | of 1867 |
| 541,344 | France | May 1, 1922 |